United States Patent [19]

Kuniyoshi

[11] 4,392,099

[45] Jul. 5, 1983

[54] STARTING SYSTEM FOR BRUSHLESS MOTOR

[75] Inventor: Masateru Kuniyoshi, Yokohama, Japan

[73] Assignee: Tokyo Shibaura Denki Kabushiki Kaisha, Kawasaki, Japan

[21] Appl. No.: 312,901

[22] Filed: Oct. 19, 1981

Related U.S. Application Data

[63] Continuation of Ser. No. 119,520, Feb. 7, 1980, abandoned.

[30] Foreign Application Priority Data

Feb. 20, 1979 [JP] Japan ................................. 54-18727

[51] Int. Cl.$^3$ ............................................. H02P 1/26
[52] U.S. Cl. .................................. 318/797; 318/803; 318/808; 363/65
[58] Field of Search ......................... 318/715, 720–724, 318/797–803, 807, 808, 138, 778; 363/65

[56] References Cited

U.S. PATENT DOCUMENTS

| 3,696,278 | 10/1972 | Kuniyoshi et al. | 318/138 |
| 3,887,859 | 6/1975 | Hubner | 318/722 X |
| 3,949,283 | 4/1976 | Okuyama et al. | 318/138 |
| 4,030,005 | 6/1977 | Doemen | 318/138 |
| 4,084,220 | 4/1978 | Akamatsu | 363/65 X |
| 4,132,931 | 1/1979 | Okuyama et al. | 318/799 X |
| 4,160,938 | 7/1979 | Akamatsu | 318/722 X |

FOREIGN PATENT DOCUMENTS

| 7403239 | 8/1975 | France | 318/807 |
| 53-138006 | 2/1978 | Japan . | |

Primary Examiner—J. V. Truhe
Assistant Examiner—Richard M. Moose
Attorney, Agent, or Firm—Oblon, Fisher, Spivak, McClelland & Maier

[57] ABSTRACT

A first static commutator including a first controllable thyristor rectifier and a first thyristor inverter and a second static commutator including a second controllable thyristor rectifier and a second thyristor inverter are provided. First three-phase AC voltage is supplied to the first controllable rectifier, and second three-phase AC voltage 30 degrees out of phase with said first three-phase AC voltage is supplied to the second controllable rectifier. A brushless motor includes first star-connected three-phase windings receiving the output of the first inverter and second star-connected three-phase windings and 30 degrees out of phase with said first three phase windings. During the starting period of the brushless motor the conduction of the first and second satic commutators is switched for every 30-degree rotation of the brushless motor.

5 Claims, 7 Drawing Figures

STARTING SYSTEM FOR BRUSHLESS MOTOR

This is a continuation, of application Ser. No. 119,520, filed Feb. 7, 1980 abandoned.

BACKGROUND OF THE INVENTION

This invention relates to a starting system for a brushless motor and, more particularly, to a starting system for a brushless motor which reduces the pulsations or torque at the time of the start.

The method of starting a DC brushless motor, in which current passes through the individual windings in the brushless motor for a period of 120 degrees is well known in the art. As an example of this method, what is called a current ON-OFF starting method is disclosed in the U.S. Pat. No. 3,696,278, in which AC power is supplied to a controllable thyristor rectifier, the DC output from the controllable thyristor rectifier is supplied to a thyristor inverter through a DC reactor, the output of the thyristor inverter is supplied to a brushless motor and the brushless motor is started by causing the Dc current from the controllable thyristor rectifier to be turned ON and OFF intermittently. In this method, the rectifier is adapted to function temporarily a power regenerator circuit at each time when commutation of the brushless motor is made, that is, its DC current is temporarily reduced to zero for every instant of commutation, during the starting period of the brushless motor. Therefore, the ratio of the period of zero current from the rectifier to the commutation period is increased with increasing speed of the brushless motor, and there are such disadvantages as reduction of motor torque with reduction of the average current supplied to the motor and increase of pulsations of torque due to the ON-OFF control of the DC current.

SUMMARY OF THE INVENTION

An object of the invention, accordingly, is to provide a starting system for a brushless motor, in which first and second static commutation circuits having respective DC intermediate circuits are alternately rendered conductive to cause twelve-phase commutation of the brushless motor with the outputs of these two static commutation circuits, and which enables reduction of the torque pulsations at the time of starting the motor.

The brushless motor apparatus, to which the starting system according to the invention is applied, comprises a first static commutation circuit including a first controllable thyristor rectifier, a first thyristor inverter and a first DC reactor inserted in a DC circuit between the first rectifier and first inverter, a second static commutation circuit including a second controllable thyristor rectifier, a second thyristor inverter and a second DC reactor inserted in a DC circuit between the second rectifier and second inverter, a power source transformer for supplying three-phase AC voltage having a first phase to the first controllable thyristor rectifier and supplying three-phase AC voltage having a second phase 30 degrees out of phase with the first phase to the second controllable thyristor rectifier, and a load including a brushless motor and receiving the outputs of the first and second inverters; wherein the starting system comprises a means for rendering the first and second commutation circuits alternately conductive in synchronism with the rotation of the brushless motor at the time of starting the brushless motor.

BRIEF DESCRIPTION OF THE PREFERRED EMBODIMENT

DESCRIPTION OF THE PREFERRED EMBODIMENT

Figure 1:
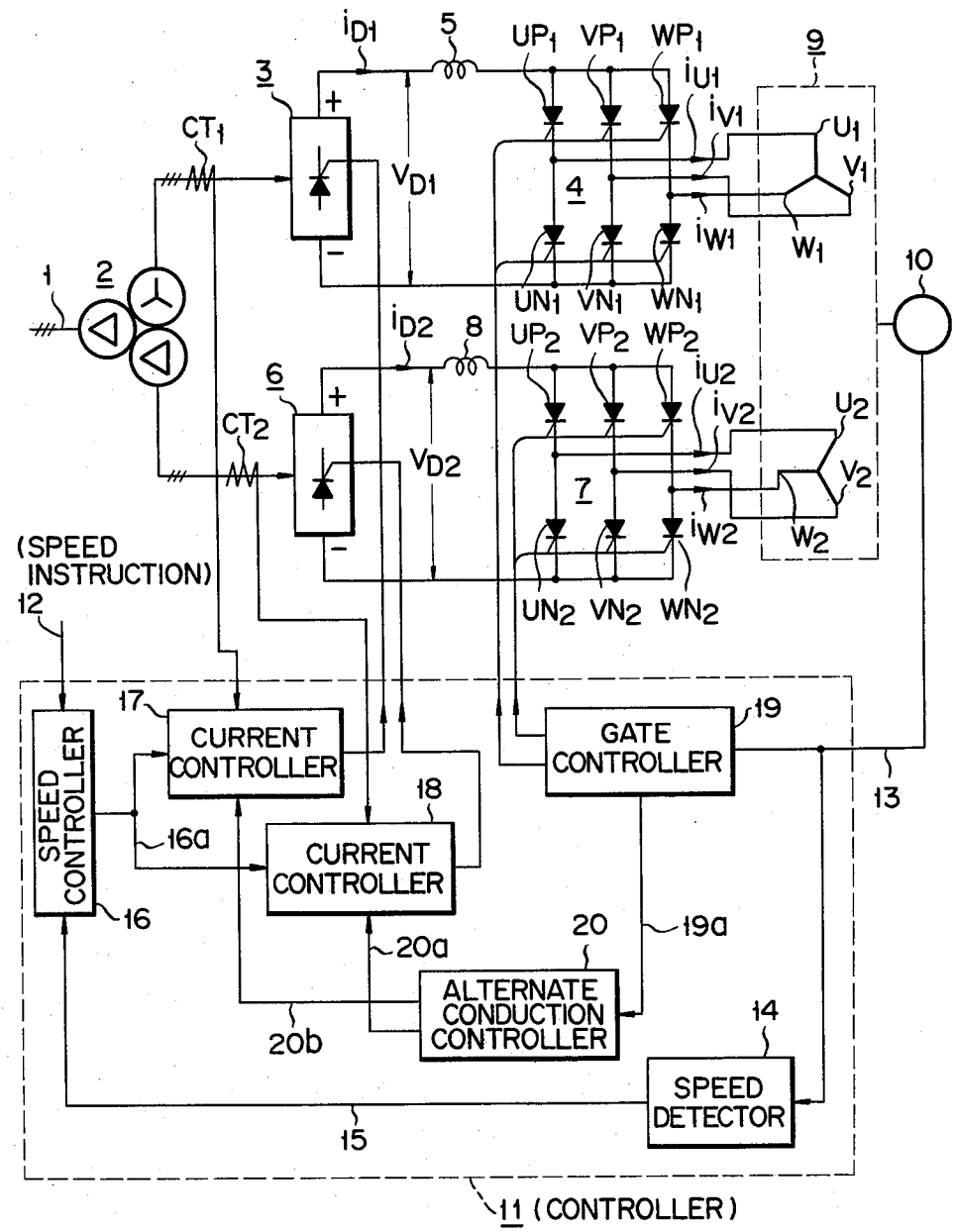
FIG. 1 is a block diagram showing one embodiment of the invention.

Referring now to FIG. 1, three-phase AC power source lines 1 are connected to the primary windings (in delta connection) of a power source transformer 2, which has first and second secondary windings, with the first secondary windings in star connection and the second in delta connection. There is a phase difference corresponding to an electric angle of 30 degrees between the phase voltages on two corresponding secondary windings. A first static commutation circuit includes a first controllable thyristor rectifier 3, a first thyristor inverter 4 and a DC reactor 5 inserted in a DC circuit between the rectifier 3 and inverter 4. A second static commutation circcuit includes a second controllable thyristor rectifier 6, a second thyristor inverter 7 and a DC reactor 8 inserted in a DC circuit between the rectifier 6 and inverter 7. The first inverter 4 has a six-arm construction, for instance including silicon controlled rectifiers (SCR) $UP_1$ to $WN_1$. The rectifier 3 has a similar six-arm construction, although it is represented by a single SCR. The second inverter 7 also has a six-arm construction, for instance including SCRs $UP_2$ to $WN_2$, and the rectifier 6 also has a similar six-arm construction while it is represented by a single SCR. The star-connected secondary windings of the transformer 2 are connected through a current transformer $CT_1$ to the rectifier 3, and the delta-connected secondary windings are connected through a current transformer $CT_2$ to the rectifier 6. A load 9 (which is a synchronous motor in the instant embodiment) consists of a sole brushless motor. The stator of the motor has first star-connected windings $U_1$, $V_1$ and $W_1$ and second star-connected windings $U_2$, $V_2$ and $W_2$, with corresponding windings, for instance the windings $U_1$ and $U_2$, being 30 degrees out of phase with each other. The exciting windings of the motor 9 are not shown. Designated at 10 is a position detector for detecting the position of the rotor of the motor 9, and at 11 a controller for giving a control signal to the gate of each SCR in accordance with the output of the position detector 10. In the Figure, the output currents from the first and second rectifiers 3 and 6 are respectively indicated by $i_{D1}$ and $i_{D2}$, and their output voltages by $V_{D1}$ and $V_{D2}$.

In the controller 11, designated at 12, 13 and 15 are respectively a motor speed instruction signal, the output signal of the position detector 10 and a detected speed signal. The signal 13 is coupled to a speed detector 14, and a speed controller 16 compares the speed instruction signal 12 and the detected speed signal 15 and amplifies the resultant signal to produce an output which is given as current instruction signal 16a to current controllers 17 and 18. The current controller 17 compares the current instruction signal 16a and a current detected by the current transformer $CT_1$ to produce a resultant difference signal, with which the phases of gate pulses impressed upon the gates of the SCRs of the first rectifier 3 are controlled. The current detector 18 compares the current instruction signal 16a and a current detected by the current transformer CT$_2$ to produce a resultant difference signal, with which the phases of gate pulses impressed upon the gate of the SCRs of the second rectifier 6 are controlled. A gate controller 19 receives the rotor position detection signal 13 and controls the phases of gate pulses given to the gates of the SCRs of the first and second inverters 4 and 7. Also, it gives a control pulse 19a to an alternate conduction controller 20 for every 30-degree rotation of the rotor of the motor 9 in order to make alternate conduction control at the time of starting the motor to be described hereinafter in connection with FIGS. 2A to 2D. The alternate conduction controller 20 consists of, for instance, a flip-flop circuit and gives a signal of logic value "1" or "0" to the current contollers 17 and 18 in accordance with the control signal 19a. The outputs of the current controllers 17 and 18 are given to the gates of the SCRs of the rectifiers 3 and 6 for effecting alternate conduction control of the first and second rectifiers 3 and 6 for every 30-degree rotation of the motor rotor. At this time, the output currents $i_{D1}$ and $i_{D2}$ of the rectifiers are controlled such that their predetermined rising and falling periods are substantially equal to each other.

The operation of the apparatus shown in FIG. 1 will now be described with reference to FIGS. 2A to 2D. At the time of the start of brushless motor in an apparatus having the DC intermediate circuit, the rotational speed of the brushless motor 9 is low, so that no load current flows into the motor at this start time. Accordingly, as mentioned earlier the so-called current ON-OFF starting method is well known in the art, in which the commutation of the SCRs constituting the inverters 4 and 7 is controlled at the time of strating the motor by ON-OFF controlling the rectifier current. It has also been mentioned earlier that this prior-art current ON-OFF starting method has inherent problems that reduction of motor torque results from reduction of the average current supplied to the motor with increasing motor speed and that pulsations of torque are increased due to ON-OFF control of the rectifier current. These drawbacks are overcome according to the invention as will be made clear by the following description. Referring now to FIGS. 2A to 2D, at an instant $t_0$ immediately after the start, the SCRs UP$_1$ and VN$_1$ in the first inverter 4 are turned on by a signal produced from the gate controller 19 in accordance with the signal 13 from the position detector 10. As a result, the output current $i_{D1}$ from the first rectifier 3 is caused to flow from a positive terminal thereof through the DC reactor 5, SCR UP$_1$, stator winding U$_1$, stator winding V$_1$ and SCR VN$_1$ to a negative terminal of the rectifier 3. The rotor is rotated by an electric angle of 30 degrees by the interaction of the current through the windings U$_1$ and V$_1$ with a magnetic flux from exciting magnetic poles (not shown) of the motor 9. During a time period between the time point $t_0$ and a time period $t_1$, the output of the current controller 18, that is, the current instruction signal to the SCRs of the rectifier 6 is made zero by the output 20a of the alternate conduction controller 20. Thus, the gate voltage phase of the second rectifier 6 is controlled to be above 90°, so that the rectifier 6 is controlled to be the inversion mode. Consequently, the second rectifier 6 is eventually brought to the non-conductive state.

As has been mentioned, when an instant $t_1$ is reached after the rotor has been rotated by 30 degrees, the logic output 20a of the alternate conduction controller 20 is inverted from "0" to "1", causing the current instruction signal from the current controller 18 to increase from zero to the level of the output 16a of the speed controller 16 in a predetermined rising period. Meanwhile, the current controller 17 is controlled according to the output 20b of the alternate conduction controller 20, with its current instruction signal output caused to decrease from the level of the output 16a of the speed controller 16 to zero in a predetermined falling period. Further, at the instant $t_1$ a gate signal for turning on the SCRs UP$_2$ and VN$_2$ is given from the gate controller 19 to the second inverter 7. With the current instruction signal from the current controller 17 the first rectifier 3 is controlled to be in the inversion mode, with the previous current reduced to zero within a predetermined falling period, whereby the first rectifier 3 is rendered non-conductive. The second rectifier 6 is caused to get into the forward conversion mode, with its current caused to flow through its positive terminal, DC reactor 8, SCR UP$_2$, stator winding U$_2$, stator winding V$_2$, SCR VN$_2$ and its negative terminal. This current is increased to the level specified by the signal 16a in a 10 predetermined rising period and then held at the specified level. In consequence, the rotor is further rotated by 30 degrees till an instant $t_2$. The aforementioned sequence of alternate conduction of the first and second static cmmutation is repeated for every 30 degree rotation of the rotor.

Figure 2:
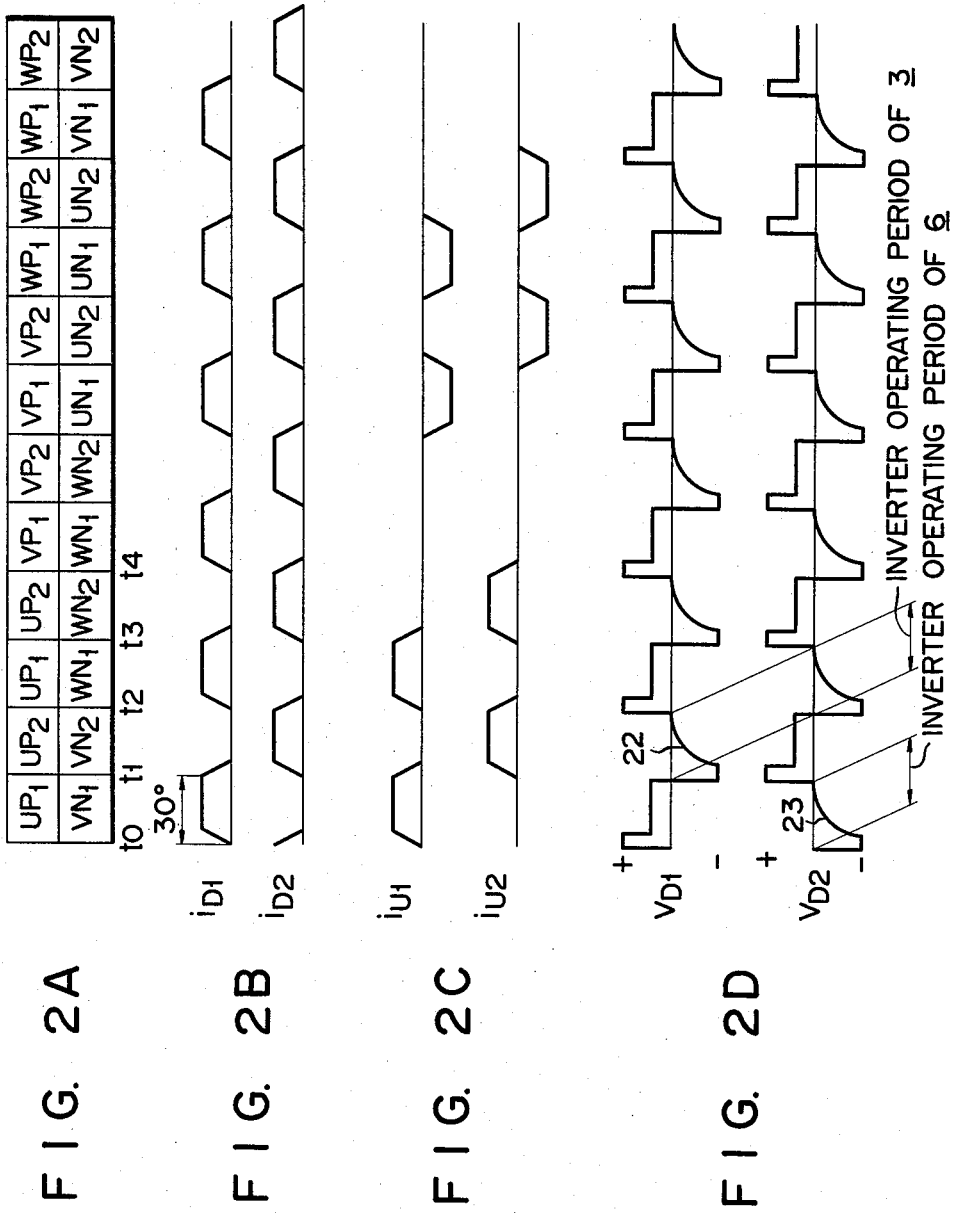
FIGS. 2A to 2D show a time chart illustrating the operation of the apparatus shown in FIG. 1.

FIG. 2A shows the conduction mode of the SCRs of the first and second inverters, FIG. 2B shows the waveforms of the DC output currents $i_{D1}$ and $i_{D2}$ from the first and second rectifiers, FIG. 2C shows waveforms of the stator input currents in the brushless motor 9 for one phase, for instance input currents $i_{U1}$ and $i_{U2}$, and FIG. 2D shows the waveforms of the output voltages $V_{D1}$ and $V_{D2}$ of the first and second rectifiers 3 and 6. Although not shown in the Figure, the currents $i_{V1}$ and $i_{W1}$ are lagging behind the current $i_{U1}$ and $i_{V1}$ by 120 degrees respectively and have the same waveform as the current $i_{U1}$, and the currents $i_{V2}$ and $i_{W2}$ are lagging behind the current $i_{U2}$ and $i_{V2}$ by 120 degrees respectively and have the same waveform as the current $i_{U2}$. A waveform 22 shown in FIG. 2D shows that the first rectifier or forward converter 3 operates in the inversion mode during the period between the instants $t_1$ to $t_2$, and a waveform 23 shows that the second rectifier or forward converter 6 operates in the inversion mode during the period between the instants $t_0$ and $t_1$. In FIG. 2B, the rising and falling periods of the currents $i_{D1}$ and $i_{D2}$ are shown to be substantially equal to each other, and this can be realized by appropriately constructing the current controllers 17 and 18 with prior-art techniques. By making both these periods equal it is possible to minimize torque pulsations in the motor at the time of the alternate conduction control.

Figure 3:
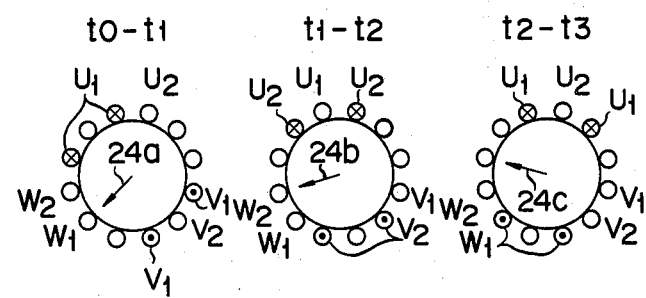
FIG. 3 shows in pictorial views the stator winding of the brushless motor shown in FIG. 1 and magnetomotive forces produced.

A first feature of the effects obtainable according to the invention is that the SCRs can be reliably turned off since the period in which the currents $i_{D1}$ and $i_{D2}$ is substantially zero corresponds to 30 degrees of the rotation of the rotor. A second feature is that torque pulsations can be reduced compared to the case of the prior-art current ON-OFF starting method. This is because of the fact that by alternately rendering the first and second commutation circuits conductive the resultant magnetomotive force that is produced by all of the stator windings of the motor 9 is rotated without interruption with a step angle of 30 degrees of the rotation of the rotor in synchronism thereto although the current in each winding is caused to flow intermittently for 30 degrees. More particularly, during the period between the instants $t_0$ and $t_1$ current is caused to flow through the windings $U_1$ and $V_1$ in the illustrated directions so as to produce a magnetomotive force 24a directed in the illustrated direction (FIG. 3A), during the period between the instants $t_1$ and $t_2$ current is caused to flow through the windings $U_2$ and $V_2$ in the illustrated directions so as to produce a magnetomotive force 24b, during the period between the instants $t_2$ and $t_3$ current is caused to flow through the windings $U_1$ and $W_1$ in the illustrated directions so as to produce a magnetomotive force 24c, and so on. In this way, current is caused to flow through the individual windings so that the resultant magnetomotive force is rotated in the clockwise direction with a step angle of 30 degrees. This is a feature of the twelve-phase commutation.

The afore-mentioned alternate conduction control at the time of starting the motor is continued until the motor speed is increased to a value at which load commutation or natural commutation is possible (5 to 10% of the rated speed). When the speed is increased up to this value, the load commutation or natural commutation is brought about by the controller 11 as in the prior-art current ON-OFF starting method. Thereafter, the current through each stator winding has a 120-degree rectangular waveform. During the aforementioned starting period the well-known commutation leading angle $\beta_0$ is set substantially to 0 degree, and when switching over to the load commutation the commutation leading angle is switched to a value at which the load commutation is possible as is well known in the art. When operating the motor through the aforementioned alternative conduction control only, the motor used may be an induction motor. The DC reactors 5 and 8 may, if necessary, be magnetically coupled to each other.

Figure 4:
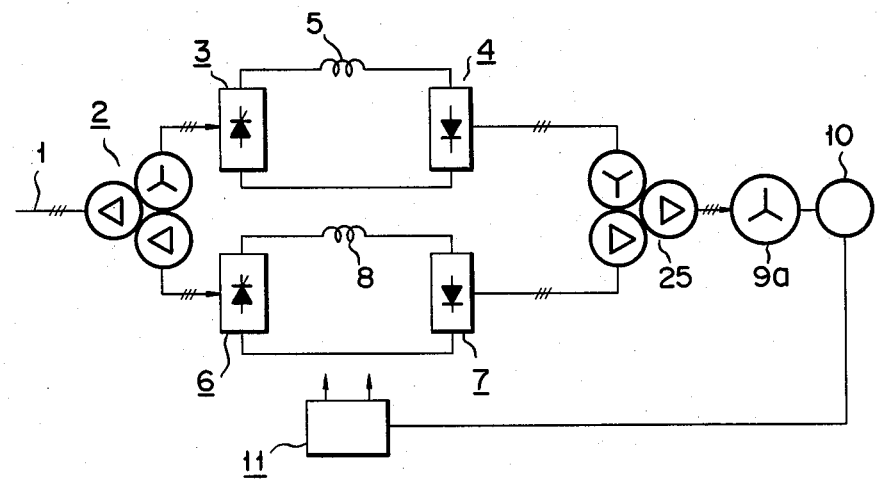
FIG. 4 is a block diagram showing another embodiment of the invention.

FIG. 4 shows another embodiment, in which a load transformer 25 and a synchronous motor 9a are used in view of the sole motor 9 in the embodiment of FIG. 4. In FIG. 4, parts other than the load are the same as those in FIG. 1, so like parts are designated by like reference numerals and are not described any further. The load transformer 25 has first and second primary windings, with the first windings connected in star connection and the second in delta connection, and secondary windings in delta connection. The line voltages on the first and second primary windings are the same, and the line voltages on two corresponding phase windings are 30 degrees out of phase with each other. The secondary windings are connected to the respective stator windings of the three-phase synchronous motor 9a. The output currents from the first and second inverters 4 and 7 are combined in the transformer 25, and the output current from the transformer secondary is supplied as twelve-phase commutated three-phase alternating current to the stator windings of the synchronous motor 9a. A feature of this embodiment resides in that the first and second commutation circuits and voltage and current ratings of the motor 9a can be freely designed by appropriately designing the transformer 25. Of course, it is possible to obtain the same effects as in the first embodiment of FIG. 1.

The first and second commutation circuits, as shown in FIGS. 1 and 4, are electrically insulated from each other, so that the grounding point can be freely selected. Usually, however, the neutral point in the star-connected stator windings is grounded. If trouble occurs in one of the first and second commutation circuits, the faulty commutation circuit may be disconnected by a breaker (not shown) for continually operating the motor with the sound commutation circuit alone. The system according to the invention may be applied to the speed control of motors requiring low starting torque such as those for pumps and blowers as well.

What is claimed is:

1. In a starting system of a brushless motor in a brushless motor apparatus comprising a first static commutation circuit including a first controllable thyristor rectifier, a first thyristor inverter and a first DC reactor inserted in a DC circuit between said first rectifier and first inverter; a second static commutation circuit including a second controllable thyristor rectifier, a second thyristor inverter and a second DC reactor inserted in a DC circuit between said second rectifier and said second inverter; a power source transformer for supplying three-phase AC voltage having a first phase to said first controllable thyristor rectifier and supplying three-phase AC voltage having a second phase 30 degrees out of phase with said first phase to said second controllable thyristor rectifier and a load including a brushless motor having a rotating motor receiving the outputs of said first and second thyristor inverters; wherein said starting system comprises means for causing one of said first and second static commutation circuits to conduct a DC current therethrough and causing the other one of said first and second static commutation circuits conducting a DC current therethrough to be concurrently substantially cut off, for every 30° electrical angle of rotation of the rotor of said brushless motor at the time of starting said brushless motor.

2. A starting system for a brushless motor according to claim 1, wherein said power source transformer includes primary windings in delta connection, first secondary windings in star connection and second secondary windings in delta connection, the output from said first secondary windings being supplied to said first controllable thyristor rectifier, the output from said second secondary windings being supplied to said second controllable thyristor rectifier.

3. A starting system for a brushless motor according to claim 1, wherein said load is a brushless motor including first three-phase star-connected stator windings and second three-phase star-connected stator windings 30 degrees out of phase with said first stator windings, the output from said first thyristor inverter being supplied to said first stator windings, the output from said second thyristor inverter being supplied to said second stator windings.

4. A starting system for a brushless motor according to claim 1, wherein said load includes a load transformer having first three-phase star-connected primary windings, second three-phase delta-connected primary windings and three-phase delta-connected secondary windings and a brushless motor having three-phase star-connected stator windings receiving the output from said secondary windings of said load transformer, the output from said first thyristor inverter being supplied to said first primary windings, the output from said second thyristor inverter being supplied to said second primary windings.

5. A starting system for a brushless motor according to claim 1, wherein the output currents from said first and second controllable thyristor rectifiers are controlled such that the rising and falling periods of said output currents are made substantially equal to each other when said first and second commutation circuits are rendered alternately conductive.

* * * * *